US012059637B2

(12) United States Patent
Roberts

(10) Patent No.: US 12,059,637 B2
(45) Date of Patent: Aug. 13, 2024

(54) APPARATUS AND METHOD TO PREVENT DOWNWARD FLOW OF LIQUID DURING A GAS ONLY WASHING CYCLE

(71) Applicant: ROBERTS MARKETING DE, INC., Wilmington, DE (US)

(72) Inventor: Matthew Roberts, Downingtown, PA (US)

(73) Assignee: Roberts Marketing DE, Inc., Wilimington, DE (US)

( * ) Notice: Subject to any disclaimer, the term of this patent is extended or adjusted under 35 U.S.C. 154(b) by 20 days.

(21) Appl. No.: 17/401,086

(22) Filed: Aug. 12, 2021

(65) Prior Publication Data
US 2023/0053228 A1    Feb. 16, 2023

(51) Int. Cl.
*B01D 24/46* (2006.01)
*B01D 24/24* (2006.01)
(Continued)

(52) U.S. Cl.
CPC ......... *B01D 24/4631* (2013.01); *B01D 24/24* (2013.01); *B01D 24/266* (2013.01);
(Continued)

(58) Field of Classification Search
CPC .......... C02F 2303/16; C02F 3/10; C02F 1/00; C02F 1/001; C02F 1/004; B01D 17/12; B01D 23/18; B01D 24/00; B01D 24/12; B01D 24/46; B01D 24/005; B01D 24/4621; B01D 24/24; B01D 24/4631; B01D 24/20; B01D 24/305; B01D 24/26; B01D 23/22; B01D 24/4673; B01D 24/4636; B01D 24/38; B01D 24/14; B01D 24/4694;
(Continued)

(56) References Cited

U.S. PATENT DOCUMENTS 3,342,334 A * 9/1967 Soriente et al. ....... B01D 35/16
210/108
3,817,378 A * 6/1974 Ross ................... B01D 24/4631
210/275
(Continued)

OTHER PUBLICATIONS

Leopold® Type S® Technology Underdrain brochure, 4 pages, 2012 (NPL 1).

*Primary Examiner* — Patrick Orme
(74) *Attorney, Agent, or Firm* — Merek, Blackmon & Voorhees, LLC

(57) ABSTRACT

Devices and methods associated with these devices for significantly reducing or eliminating liquid (e.g., water) in a water or wastewater treatment unit above the underdrain from moving downwardly into the underdrain during an air only wash cycle of the treatment unit. The treatment unit can take many forms including but not limited to an upflow filter and a downflow filter. The treatment unit may include a filter bed having one or more layers of filter media supported by gravel above the underdrain. The treatment unit may also include an underdrain having a porous plate, slotted plate or slotted upper structure that obviates the need for gravel. Positive pressure is provided to the underdrain to overcome the downward force of the driving head in the treatment unit to significantly reduce or prevent liquid present in the treatment unit above the underdrain from moving downwardly into the underdrain.

18 Claims, 5 Drawing Sheets

(51) Int. Cl.
  *B01D 24/26*     (2006.01)
  *C02F 1/00*      (2023.01)
(52) U.S. Cl.
  CPC .......... *C02F 1/001* (2013.01); *B01D 2101/04* (2013.01); *C02F 2303/16* (2013.01)
(58) Field of Classification Search
  CPC ...... B01D 24/001; B01D 24/22; B01D 24/66; B01D 24/263; B01D 24/266; B01D 2101/04; B01D 2101/02; B01D 2201/04; B01D 2201/64; B01D 2201/087; B01D 2201/0407; B01D 2201/0415; B01D 21/0045; B01D 21/003; B01D 21/02; B01D 21/0006; B01D 39/10; B01D 29/46; B01D 29/66; B01D 33/48
  See application file for complete search history.

(56) References Cited

U.S. PATENT DOCUMENTS

| | | | | |
|---|---|---|---|---|
| 4,196,079 | A * | 4/1980 | Ward | B01D 24/4636 |
| | | | | 210/794 |
| 5,489,388 | A | 2/1996 | Brown et al. | |
| 6,830,684 | B2 * | 12/2004 | Stegge | B01D 24/4631 |
| | | | | 210/275 |
| 8,333,889 | B2 * | 12/2012 | Roberts | B01D 24/4631 |
| | | | | 210/275 |
| 10,913,014 | B2 * | 2/2021 | Berkebile | B01D 24/24 |
| 2009/0071914 | A1 * | 3/2009 | Roberts | B01D 24/4631 |
| | | | | 210/291 |

* cited by examiner

APPARATUS AND METHOD TO PREVENT DOWNWARD FLOW OF LIQUID DURING A GAS ONLY WASHING CYCLE

FIELD OF THE INVENTION

Preferred forms of the present invention are directed to a liquid treatment unit employing a granular media to remove impurities from a liquid processed by the treatment unit. Preferably, the treatment unit is a water or wastewater treatment unit having a bed of granular media to remove impurities from water or wastewater processed by the treatment unit. The treatment unit can take many forms including a clarifier (e.g., an upflow clarifier or downflow clarifier) proceeding one or more polishing or finishing filters or a polishing or finishing filter (e.g., an upflow filter or downflow filter) processing liquid subsequent to the liquid being pretreated by any known pretreatment unit or device including but not limited to a clarifier.

The bed of granular media may be a single layer of filter/clarifier media supported directly on an underdrain of the treatment unit designed/configured to support the filter/clarifier media without one or more layers of gravel. For example, the underdrain may include a porous plate, slotted plate or slotted upper structure that obviates the need for one or more layers of support gravel. Further, the bed of granular media can include one or more filter/clarifier layers supported above the underdrain by one or more gravel support layers.

Treatment units that employ a granular media to remove impurities from a liquid to be processed are washed between a filter cycle or an impurity removal cycle to remove impurities trapped during the filter or the impurity removal cycle. The washing cycle typically includes a combination of a gas (e.g., air) only washing cycle, a liquid only (e.g., filtered water) washing cycle and a combined liquid (e.g., filtered water) and gas (e.g., air) washing cycle in which liquid and gas are simultaneously directed upwardly through the granular media. During all washing cycles, a liquid is typically present in the underdrain and above the underdrain.

Preferred forms on the present invention are configured such that during gas/air only wash cycles, a positive pressure on the underdrain is created so that the volume of liquid present in the underdrain is maintained substantially constant during the air/gas only wash cycle. The positive pressure can be created in various ways including directing a liquid, preferably filtered water, into the underdrain during the gas/air only cycle so that the volume of liquid in the underdrain remains constant during the gas/air only cycle to prevent liquid in the compartment housing the underdrain and the granular media above the underdrain from moving downwardly into the underdrain. Preferred forms of the present invention are also configured to prevent liquid above the underdrain from flowing downwardly in the compartment housing the underdrain and the granular media to prevent a downward force generated from liquid flowing downwardly during an gas/air only cycle from being imparted on the bed of granular media to avoid media clogging the discharge ports or opening of underdrain.

BACKGROUND OF THE INVENTION

In a treatment unit having a bed of granular media including one or more layers of filter/clarifier media configured to remove impurities from the liquid to be processed, it is imperative that the granular media be periodically washed to remove impurities trapped in the granular media during a filtration or impurity removal cycle, mode, stage or phase. If the washing cycle, mode, stage or phase is not properly performed, the efficiency of the treatment unit will be greatly reduced as the filtering cycle or impurity removal cycle, mode, stage or phase will be shortened which necessarily will reduce the time the treatment unit can treat liquid to be processed.

It is customary to wash a bed of granular media with air only, water only and/or simultaneous air and water. An air only cycle, mode, stage or phase of a washing process creates significant challenges. Specifically, a volume of liquid will be present in the underdrain and in the compartment housing the underdrain above the underdrain prior to and during the air only cycle. As the air is injected into the underdrain and is distributed down the length of the underdrain during an air only wash cycle, the air displaces or forces the liquid present in the underdrain out of the underdrain and into the compartment housing the underdrain above the underdrain. The liquid in the underdrain displaced by the air injected and distributed through the underdrain during the air only wash cycle, is replaced with liquid from above the underdrain traveling downwardly and into the underdrain.

The downward force exerted by liquid above the underdrain rushing downwardly and into the underdrain is detrimental to proper/optimum functioning of the underdrain in at least two key/material respects. First, the downwardly rushing liquid causes maldistribution of the air during the air only cycle, stage, phase or mode of washing the granular media. Specifically, the downwardly rushing liquid blocks or otherwise obstructs air discharge ports in the underdrain preventing a continuous and uniform distribution of air through the granular media achieving optimal cleaning of the granular media during the air only cycle. Maldistribution can defeat the purpose of an air only wash or at least significantly reduce the effectiveness of the air only wash which in turn results in shorter filtering cycles or impurity removal cycles.

The second adverse consequence of the downwardly rushing liquid is that the driving force of the downwardly rushing liquid pulls the granular media downwardly and into unintended positions that clog, plug, block or obstruct water and/or air discharge ports (e.g., slots, orifices or openings) formed in the top deck of the underdrain or in a media retaining plate or structure (e.g., a porous plate) connected to the underdrain. This clogging, plugging, blocking or obstructing of water and/air discharge ports, passages, openings, etc. has become so significant that air only washes have been eliminated from some washing processes/regimens significantly reducing the effectiveness of the washing process.

U.S. Pat. No. 5,489,388 discloses a centrally located trough, conduit or water recovery channel in underdrains that purportedly allows water from the filter compartment to return into the underdrain without obstructing the air discharge openings during an air only wash process. The purported solution of U.S. Pat. No. 5,489,388 does not allow for resolution of the return of water into an underdrain of an existing filter without a major overhaul of the filter, i.e., shutting the filter down while the existing underdrain is replaced with an underdrain of the type disclosed by U.S. Pat. No. 5,489,388. This is extremely undesirable as the filter must be taken out of service for the entire time that it takes to replace the existing underdrain with the underdrain disclosed by U.S. Pat. No. 5,489,388. Also, the costs to the filter owner are dramatically increased including the cost of an entirely new underdrain and the cost of a significant filter rehabilitation which includes removing all of the filter media, removing the existing underdrain, installing a new underdrain and installing a filter bed on the new underdrain.

Further, the purported solution disclosed by U.S. Pat. No. 5,489,388 does not solve the fundamental problem of water traveling/rushing downwardly into an underdrain during an air only wash cycle as water in the filter compartment is allowed to move downwardly and enter the underdrain which necessarily creates a downward pressure on the filter media in the filter bed causing the media to be pulled downwardly into unintended positions which clog, plug, block or obstruct water and/or air discharge ports formed in the top deck of the underdrain or in media retaining plates or other structures (e.g., porous plate) that are connected to the top of the underdrain.

OBJECTS AND SUMMARY OF THE INVENTION

An object of a preferred form of the present invention is to provide a novel and unobvious device and/or process for preventing or significantly reducing liquid (e.g., water) in a compartment housing granular media from traveling downwardly into an underdrain during a gas (e.g., air) only wash process.

Another object of a preferred form of the present invention is directed to a treatment unit and/or process which equalizes, compensates or counteracts the downward force of the driving head in the filter compartment to significantly reduce or prevent liquid from a filter or clarifier compartment above the underdrain from moving downwardly into the underdrain during a gas only wash cycle of the treatment unit.

A further object of a preferred form of the present invention is to provide a process of washing a treatment unit employing granular media to remove impurities that can be readily used in an existing treatment unit wherein the washing process solves one or more mal-distribution issues that the existing treatment unit is encountering during an air or gas only washing cycle of the existing treatment unit without modifying the physical structure of the underdrain of the existing treatment unit.

Still another object of a preferred form of the present invention is to provide a process which creates a positive pressure to equalize, compensate or counteract the downward force of the driving head in a compartment housing granular media to significantly reduce or prevent liquid from the compartment above the underdrain from moving downwardly into the underdrain during an air or gas only wash cycle of the treatment unit.

Still a further object of a preferred form of the present invention is to provide a treatment unit and/or process in which a liquid is used to create a positive pressure to equalize, compensate or counteract the downward force of the driving head in a compartment housing granular media to significantly reduce or prevent liquid from the compartment above the underdrain from moving downwardly into the underdrain during an air or gas only wash cycle of the treatment unit.

Yet another object of a preferred form on the present invention is to provide a treatment unit and/or process in which a washing liquid (e.g., filtered water) is used to create a positive pressure to equalize, compensate or counteract the downward force of the driving head in a compartment to significantly reduce or prevent water from the compartment above the underdrain from moving downwardly into the underdrain during an air or gas only wash cycle of the treatment unit.

Yet a further object of a preferred form on the present invention is to provide a treatment unit and/or process in which, during an air or gas only wash cycle, a liquid (e.g., filtered water) from a liquid storage container or storage chamber external to a compartment housing granular media is introduced into the underdrain to significantly reduce or prevent water from the compartment above the underdrain from moving downwardly into the underdrain during the air or gas only wash cycle wherein the liquid is introduced such that the water level in the compartment does not raise to a level at or above a height where water from the compartment will flow over into a waste trough operably associated with the compartment.

It must be understood that no one embodiment of the present invention need include all of the aforementioned objects of the present invention. Rather, a given embodiment may include one or none of the aforementioned objects. Accordingly, these objects are not to be used to limit the scope of the claims of the present invention. Further, the above is not an exhaustive list of the advantages and objects of the preferred forms of the present invention. Other advantages and objects of preferred forms of the present invention will be readily appreciated from the description of the preferred forms of the present invention.

In summary, one preferred embodiment of the present invention is directed to a method of washing a water or wastewater treatment unit having a compartment housing a bed of granular media above an underdrain, comprising the steps of: (a) during a gas only phase of a washing cycle, directing a gas into and upwardly through an underdrain into a bed of granular media, wherein in the gas only phase of a washing cycle a volume of liquid is present in the underdrain and liquid is also present above the underdrain in a compartment housing the underdrain and the bed of granular media; and, (b) during the gas only phase of a washing cycle, creating a positive pressure on the underdrain to stabilize the volume of liquid present in the underdrain during the air only phase of a washing cycle to prevent the liquid in the compartment above the underdrain from flowing downwardly into the underdrain during the gas only phase of a washing cycle.

Another preferred embodiment of the present invention is directed to a method of preventing liquid present in a water or wastewater treatment unit having a bed of granular media and an underdrain from flowing downwardly into the underdrain during an air only phase of a washing cycle, comprising the steps of: (a) during an air only phase of a washing cycle performed on a water or wastewater treatment unit having a bed of granular media and an underdrain, directing air into and upwardly through the underdrain and subsequently into the bed of granular media disposed above the underdrain, wherein during the air only phase of a washing cycle a volume of water is present in the underdrain; and, (b) during the air only phase of a washing cycle, maintaining the volume of water in the underdrain substantially constant to prevent water above the underdrain from flowing downwardly into the underdrain during the air only phase of a washing cycle.

A further embodiment of the present invention is directed to a method of washing a water or wastewater treatment unit, comprising the steps of: (a) draining a filter compartment having an underdrain, a granular media and a water trough so that a water level in the filter compartment is at a first level wherein the first level is below the water trough and above an uppermost portion of the underdrain; (b) subsequent to the draining step (a), directing air into and upwardly through the underdrain into the granular media during an air only phase of a washing cycle, wherein in the air only phase of a washing cycle a volume of water is present in the underdrain; and, (c) during the air only phase of a washing cycle, creating a positive pressure on the underdrain to stabilize the volume of water present in the underdrain during the air only phase of a washing cycle while maintaining the level of liquid in the filter compartment below the water trough so that filter media cannot enter the water trough and water above the underdrain cannot flow downwardly into the underdrain.

The above summary describes preferred forms of the present invention and is not in any way to be construed as limiting the claimed invention to the preferred forms.

DETAILED DESCRIPTION OF THE PREFERRED EMBODIMENTS OF THE INVENTION

Figure 1:
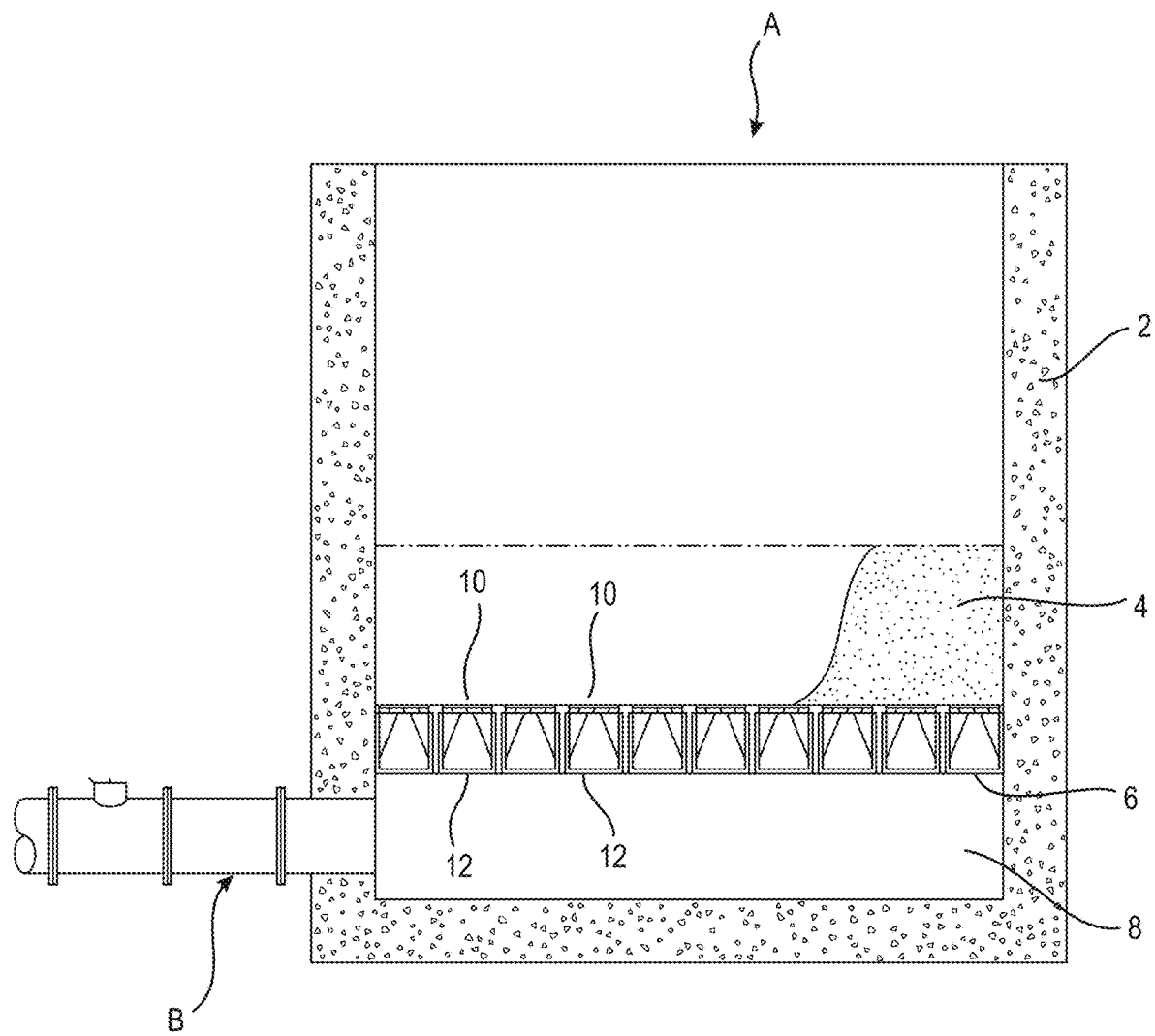
FIG. 1 is a cross-sectional view of A preferred form of treatment unit.

The preferred forms of the invention are described below with reference to FIGS. 1-5. The appended claims are not limited to the preferred forms and no term and/or phrase used herein is to be given a meaning other than its ordinary meaning unless it is expressly stated otherwise.

The preferred forms of the present invention are directed to treatment units employing granular media above an underdrain to remove impurities from liquids processed by the treatment unit. The treatment unit can take many forms including a treatment unit in which liquid to be processed (e.g., impurities removed from) travels in the same direction or the opposite direction as the washing fluid be it a gas, liquid or a combination of a gas or liquid as the washing fluids. The treatment unit can be a pretreatment unit proceeding one or more subsequent processing stages. For example, the pretreatment unit can be an upflow clarifier or a downflow clarifier preceding one or more subsequent treatment units. In an upflow clarifier, liquid to be processed (i.e., to have impurities removed therefrom) flows upwardly through the granular media. Conversely, in a downflow clarifier, the liquid to be processed is directed downwardly through the granular media.

The treatment unit can be a final stage of a liquid treatment system including but not limited to an upflow polishing filter and a downflow polishing filter. In addition, the treatment unit can be an intermediary component between a clarifier or other initial treatment component and a final polishing filter or final treatment unit. The treatment unit can take the form of a water treatment unit, a wastewater treatment unit or any other treatment unit that employs granular media to remove impurities in a fluid or liquid to be processed.

The granular media can be a single layer of media that is designed to remove impurities from a liquid to be processed. The single layer of media can be supported directly on an underdrain or on a media retaining plate or structure connected to the underdrain. The granular media can include two or more layers of media designed to remove impurities from a liquid to be processed supported directly on the underdrain or on a media retaining plate or structure connected to the underdrain. The granular media including one or more layers of impurity removing media can be disposed on and supported by one or more layers of support gravel disposed on the underdrain.

The preferred forms of the present invention are designed to prevent liquid above the underdrain in the treatment unit from flowing downwardly into the underdrain during an air or gas only wash cycle. Specifically, in the preferred forms of the invention, the volume of liquid (e.g., water) in the underdrain during an air or gas only wash cycle is stabilized or maintained constant to avoid liquid from the above the underdrain flowing downwardly toward and into the underdrain. This can be achieved in numerous different manners including turning on the water wash system while only cracking the water valve (i.e., water valve is only slightly opened) of the water wash line so that the volume of water in the underdrain is stabilized or maintained constant during an air or gas only wash cycle preventing liquid present above the underdrain from flowing downwardly into the underdrain. Regardless of the vehicle used, the system/process creates a positive pressure on the underdrain to overcome the downward force of the driving head above the underdrain. Positive pressure on the underdrain can be created using a wash water pump or by a gravity flow water wash system (e.g., water wash tower or an elevated water wash storage tank). Preferably, no washing water enters the underdrain or only a sufficient amount of washing water enters the underdrain to stabilize or maintain constant the liquid level in the underdrain during an air only wash cycle to prevent liquid above the underdrain from flowing downwardly into the underdrain during an air or gas only wash. Preferably, the liquid level in the compartment housing the underdrain the granular media raises if at all much slower than an air/water combined wash cycle and preferably at no point during the air wash only cycle does the liquid level reach a waste trough.

Numerous benefits are achieved by the preferred forms of the invention including at least the following: obviating the need for a specifically configured underdrain allowing water/liquid above the underdrain to flow into the underdrain through a water return or recovery channel or other structure to avoid air/gas discharge openings in the underdrain from being blocked or otherwise obstructed by liquid flowing downwardly into the underdrain; precluding or significantly reducing liquid from above the underdrain from flowing downwardly into the underdrain; existing systems can be readily modified without changing or altering the existing underdrain to prevent liquid above the underdrain from flowing downwardly into the underdrain during an air or gas only wash cycle; eliminating or significantly reducing the forces of liquid traveling downwardly into underdrain which forces cause granular media particles to become lodged, plugged or obstructing discharge ports, orifices, slots, etc. associated with the underdrain during an air or gas only wash cycle; and, reducing the period in which the treatment unit is operated in a waste cycle following washing of the granular media of the treatment unit and before the treatment unit can be operated in a filtration cycle, i.e., liquid returning into the underdrain is dirty which will naturally increase the dirt in the underdrain requiring a longer waste cycle being performed before the treatment unit can be operated in a filtration cycle or phase.

FIGS. 1 Through 5

Referring to FIGS. 1 to 5, treatment unit A employing a preferred form of the invention is illustrated in one of many possible configurations. The treatment unit A can take many forms including but not limited to an upflow filter/clarifier, a downflow filter/clarifier, a water or wastewater treatment unit or any other treatment unit that employs a granular media to remove impurities from a liquid.

Treatment unit A, in one most preferred form, is a water filter/clarifier for removing impurities from water. Referring to FIG. 1, a treatment unit A is illustrated in one of many possible configurations. Treatment unit A can be a polishing filter or a roughing filter (e.g., clarifier). Treatment unit A can be a downflow filter (i.e., in which influent to be filtered is directed downwardly through the filter bed during service runs) or an upflow filter (i.e., in which influent to be filtered is directed upwardly through the filter bed during service runs) or any other treatment unit employing a granular media to remove impurities from a liquid to be processed by the treatment unit.

Figure 2:
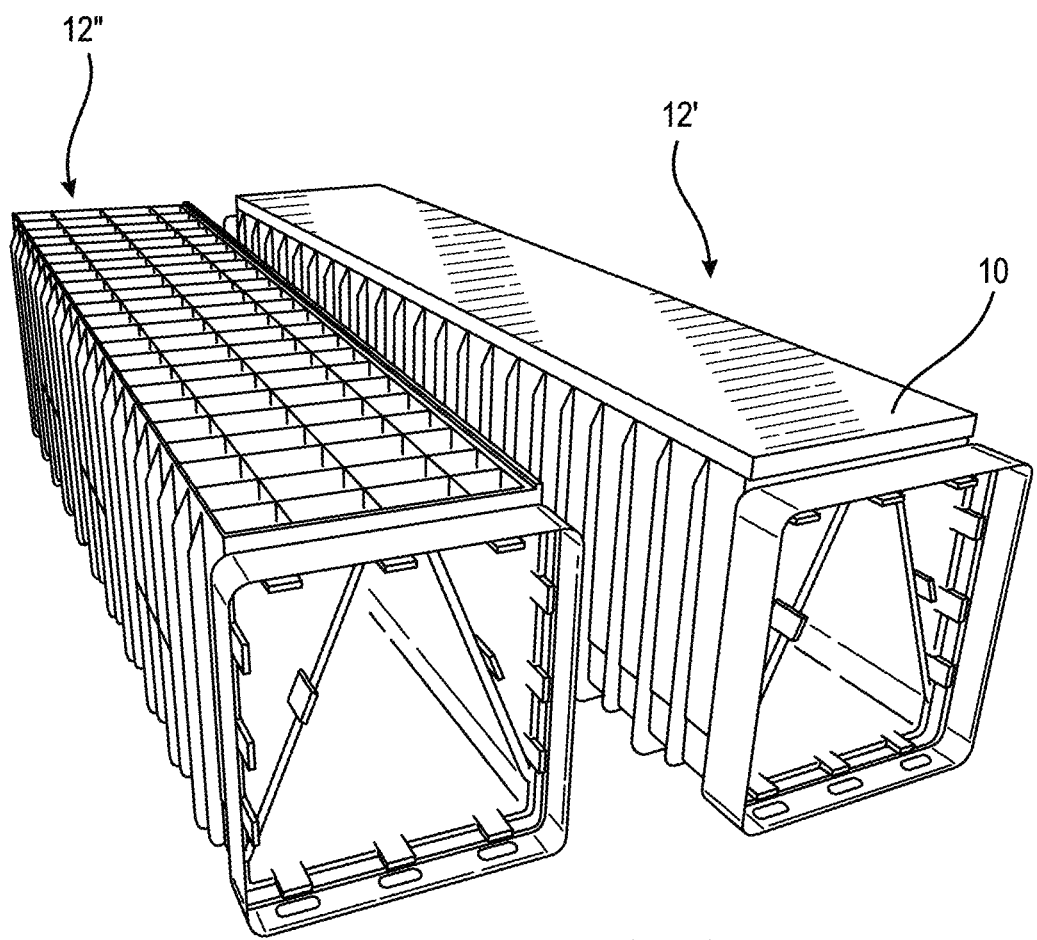
FIG. 2 is a perspective view of two preferred forms of underdrain one of which (right image) has a porous plate attached to a top deck of the underdrain.

The treatment unit A includes a filter compartment or housing 2, a granular media filter bed 4, an underdrain 6, and a flume 8. The underdrain 6 may include a porous plate 10 anchored to the top of and extending along the longitudinal axis (i.e., the axis extending into the page as seen in FIG. 1) of each of the underdrain blocks or laterals 12. FIG. 2, shows underdrain block 12' (right image) having a porous plate 10 anchored thereto and an underdrain block 12" (left image) without any media retaining structure. When underdrain block 12" is used to form the underdrain 6, one or more layers or support gravel may be used to support the filter bed 4 above the underdrain 6. While FIGS. 1 and 2 depict particular forms of underdrain blocks, it will be readily appreciated that any suitable underdrain could be used.

Washing liquid supply line B supplies a washing liquid (e.g., filtered water) to flume 8 during a washing cycle using a liquid. A washing gas can be fed to each of the underdrain laterals or blocks 12 in any suitable manner using any known or subsequently developed washing gas supply system. For example, a washing gas (e.g., air) supply system can include gas supply piping connected at one end to a source of or pressurized gas and at the other end to each end of the underdrain laterals 12 or to a top portion of each underdrain lateral 12. While flume 8 is shown as supplying a washing liquid to the underdrain 6, any known or subsequently developed washing fluid supply system can be used to supply a washing liquid to the underdrain 6.

Filter compartment 2 is depicted as being formed from concrete. However, any suitable material may be used. Filter bed 4 may be formed in any known manner. For example, the filter bed 4 can be formed of a single layer of granular media or multiple layers of granular media. The granular media can be of any suitable material including both synthetic material and naturally occurring material. Filter bed 4 may be supported by one or more gravel layers. Alternatively, underdrain 6 may utilize a porous plate, slotted plate or other media retaining means operably connected to each underdrain lateral 4 to obviate the need for gravel support layers. Further, the top deck of the underdrain may be configured to obviate the need for any media retaining means/structure as well as one or more gravel support layers.

Figure 4:
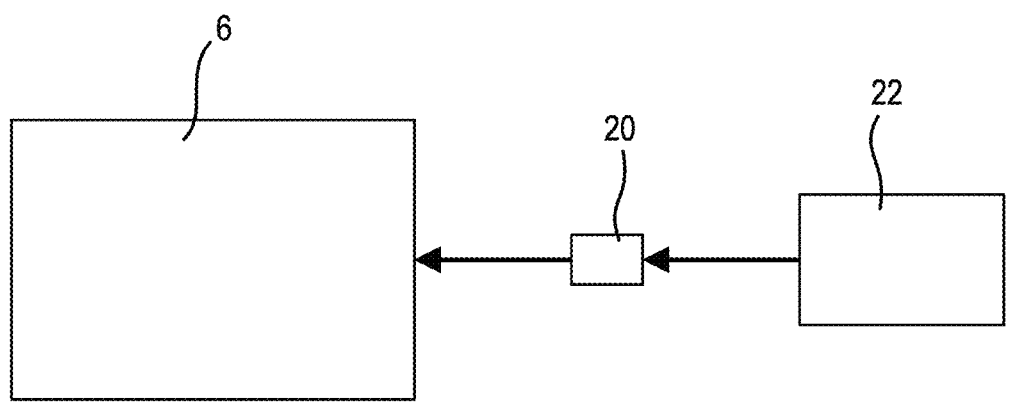
FIG. 4 is a schematic view of a system in which a pump pumps a washing liquid into the underdrain of the treatment unit.
Figure 5:
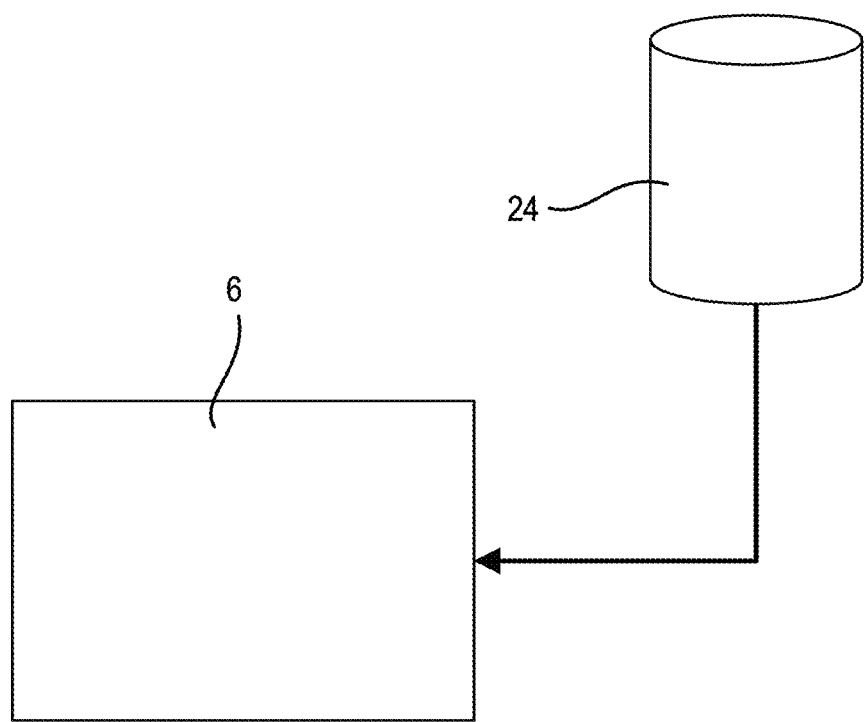
FIG. 5 is a schematic view of an elevated wash water tower connected to a treatment unit to supply wash water to the underdrain of the treatment unit by gravity.

During a service run, flume 8 will receive the effluent and direct the same through a conduit or piping system to a desired storage location if the treatment unit A is a downflow filter. However, effluent may be directed from the underdrain laterals to collection structures other than a flume. If treatment unit A is an upflow filter, effluent will be collected in a water trough or other suitable device located in the filter compartment 2 above the filter bed 4. During washing of filter bed 4, a washing liquid is directed into flume 8 by piping B and directed into and upwardly through the underdrain 6 including underdrain laterals or blocks 12 into the filter bed 4 to remove floc stored in filter bed 4 during service runs. The washing liquid can be supplied to flume 8 for all, only a portion of the washing cycle or no portion of a washing cycle (gas/air only wash cycle). Referring to FIG. 4, a pump 20 can be used to pump a filtered water from filtered water storage container 22 located outside of filter compartment 2 to underdrain 6 including underdrain blocks 12 and into and through filter bed 4 during a washing process of filter bed 4. Referring to FIG. 5, filtered water may be supplied to underdrain 6 including underdrain laterals or blocks 12 by gravity from a water tower or elevated water storage container 24.

Figure 3:
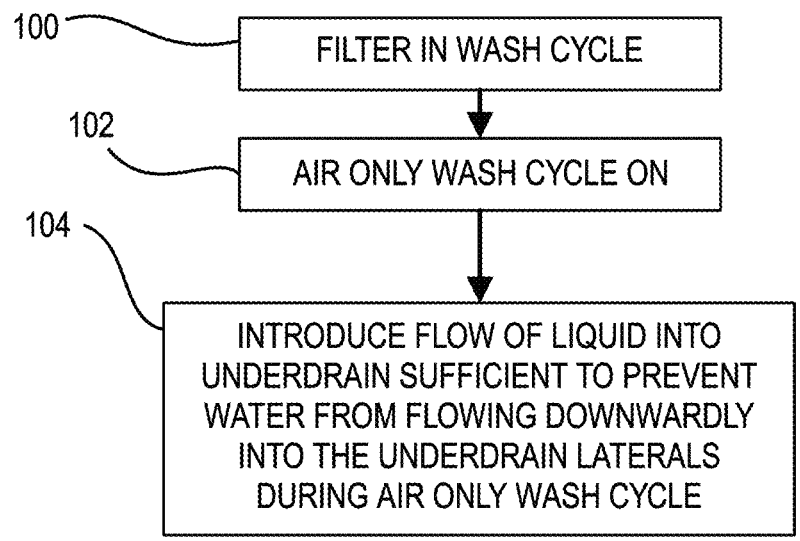
FIG. 3 is a flow chart of one preferred method of washing a treatment unit.

During a washing cycle utilizing a gas (e.g., air), a washing gas is supplied to underdrain 6 including underdrain laterals or blocks 12 through any suitable gas supply system. Referring to FIG. 3, a flow chart for a preferred washing method is illustrated. In 100, the treatment unit A is in a wash cycle. In 102, an air/gas only wash cycle is being performed on filter bed 4 by directing an air/gas into and upwardly through underdrain 6 including underdrain blocks 12 and into filter bed 4 to agitate filter bed 4 to free trapped impurities in a well-known manner. During an air/gas only wash cycle, water will be present in the underdrain 6 including underdrain blocks or laterals 12 and water will be present in the filter compartment 2 above the underdrain 6.

In 104, during an air/gas only wash cycle, a flow of a liquid (e.g., filtered water) is introduced into the underdrain 6 including underdrain blocks or laterals 12 to prevent water in the filter compartment 2 above the underdrain blocks or laterals 12 from flowing downwardly into the underdrain blocks or laterals 12.

Specifically, in the preferred forms of the invention, the volume of liquid (e.g., water) in the underdrain during an air or gas only wash cycle is stabilized or maintained constant or substantially constant to avoid liquid present above the underdrain 6 from flowing downwardly toward and into the underdrain by introducing a sufficient amount of flow of a washing liquid into the underdrain 6 including underdrain blocks 12. This can be achieved in numerous different manners including turning on the water wash system while only cracking a water valve (i.e., water valve is only slightly opened) of the water wash line so that the volume of water in the underdrain is stabilized or maintained constant or substantially during an air or gas only wash cycle preventing liquid present above the underdrain from flowing downwardly into the underdrain. Regardless of the vehicle used, the system/process of the preferred forms of the present invention creates a positive pressure on the underdrain 6 including underdrain blocks 12 to overcome the downward force of the driving head above the underdrain. Positive pressure on the underdrain can be created using a wash water pump or by a gravity flow water wash system (e.g., water wash tower or an elevated water wash storage tank). Preferably, no washing water enters the underdrain or only a sufficient amount of washing water enters the underdrain to stabilize or maintain constant the liquid level in the underdrain during an air only wash cycle to prevent liquid above the underdrain from flowing downwardly into the underdrain during an air or gas only wash. Preferably, the liquid level during the entirety of the air or gas only wash cycle in filter compartment 2 raises if at all much slower than an air/water combined wash cycle and preferably at no point during the air wash only cycle does the liquid level reach a waste trough positioned in the filter compartment 2 above the filter bed 4 and below an upper most portion of compartment 2. As is well known, the waste trough directs the washing liquid out of the filter compartment 2. In the preferred form of the present invention, positive pressure on the underdrain is created by directing a sufficient flow of liquid to the underdrain 6 including underdrain undrain laterals or blocks 12.

While this invention has been described as having a preferred design, it is understood that the preferred design can be further modified or adapted following in general the principles of the invention and including but not limited to such departures from the present invention as come within the known or customary practice in the art to which the invention pertains. The claims are not limited to the preferred embodiment and have been written to preclude such a narrow construction using the principles of claim differentiation.

I claim:

1. A method of washing a liquid treatment unit having a compartment housing a bed of granular media above an underdrain, comprising the steps of:
   during a gas only phase of a washing cycle, directing a gas into and upwardly through the underdrain into the bed of granular media, wherein in the gas only phase of the washing cycle a volume of liquid is present in the underdrain and a volume of liquid is also present above the underdrain in the compartment housing the underdrain and the bed of granular media; and,
   during the gas only phase of the washing cycle, directing a liquid into the underdrain to create a predetermined pressure in the underdrain to substantially counterbalance a downward force exerted by the volume of liquid in the compartment above the underdrain to prevent liquid from the volume of liquid in the compartment above the underdrain from flowing downwardly into the underdrain during the gas only phase of the washing cycle.

2. The method of claim 1, wherein:
   the liquid of the volume of liquid present in the underdrain and liquid of the volume of liquid present above the underdrain in the compartment housing the underdrain is water; and,
   the liquid creating a positive pressure on the underdrain is water.

3. The method of claim 1, wherein:
   the gas directed into and upwardly through the underdrain into the bed of granular media during the gas only phase of the washing cycle is pressurized air supplied by a source of pressurized air connected to the underdrain.

4. The method of claim 3, wherein:
   the compartment is one of the following: (i) a downflow filter, (ii) an upflow filter, (iii) an upflow clarifier, and (iv) a downflow clarifier.

5. The method of claim 1, wherein:
   the bed of granular media includes at least one layer of filter media.

6. The method of claim 1, wherein:
   the bed of granular media includes a plurality of layers wherein at least one of the plurality of layers is a layer of filter media.

7. A method of preventing water present in a water or wastewater treatment unit having a bed of granular media and an underdrain from flowing downwardly into the underdrain during an air only phase of a washing cycle, comprising the steps of:
   during the air only phase of a washing cycle performed on the water or wastewater treatment unit having a bed of granular media and an underdrain, directing air into and upwardly through the underdrain and subsequently into the bed of granular media disposed above the underdrain, wherein during the air only phase of the washing cycle a volume of water is present in the underdrain; and,
   during the air only phase of the washing cycle, directing water into the underdrain to replace water displaced from the underdrain during the air only phase of the washing cycle to maintain the volume of water in the underdrain substantially constant to prevent water above the underdrain from flowing downwardly into the underdrain during the air only phase of the washing cycle.

8. The method of claim 7, wherein:
   the step of directing water into the underdrain to replace water displaced from the underdrain during the air only phase of the cycle to maintain the volume of water substantially constant includes directing by gravity water from a water tower positioned outside of a compartment housing the underdrain and the bed of granular media into the underdrain during the air only phase of the washing cycle to replace water escaping from the underdrain during the air only phase of the washing cycle.

9. The method of claim 7, wherein:
   the step of maintaining the volume of water substantially constant includes directing by gravity water from an elevated water storage tank positioned outside of a compartment housing the underdrain and the bed of granular media into the underdrain during the air only phase of the washing cycle to replace water escaping from the underdrain during the air only phase of the washing cycle.

10. The method of claim 7, wherein:
    the step of maintaining the volume of water substantially constant includes pumping water from a water source to the underdrain during the air only phase of the washing cycle to replace water escaping from the underdrain during the air only phase of the washing cycle.

11. The method of claim 7, wherein:
    the water or wastewater treatment unit is one of the following: (i) a downflow filter, (ii) an upflow filter, (iii) an upflow clarifier, and (iv) a downflow clarifier.

12. A method of washing a water or wastewater treatment unit, comprising the steps of:
    draining a filter compartment having an underdrain, a granular media and a water trough so that a water level in the filter compartment is at a first level wherein the first level is below the water trough and above an uppermost portion of the underdrain;
    subsequent to the draining step, directing air into and upwardly through the underdrain into the granular media during an air only phase of a washing cycle, wherein in the air only phase of the washing cycle a volume of water is present in the underdrain; and,
    during the air only phase of the washing cycle, directing water into the underdrain to create a pressure head in the underdrain sufficient to substantially counterbalance a downward force exerted by a volume of water in the filter compartment above the underdrain to prevent the water above the underdrain from flowing downwardly into the underdrain during the air only phase of the washing cycle while maintaining a level of liquid in the filter compartment below the water trough so that the granular media cannot enter the water trough and water above the underdrain cannot flow downwardly into the underdrain.

13. The method of claim 12, further including:
the step of maintaining the positive pressure on the underdrain for an entirety of the air only phase of the washing cycle.

14. The method of claim 12, wherein:
the filter compartment is one of the following: (i) a downflow filter, (ii) an upflow filter, (iii) an upflow clarifier, and (iv) a downflow clarifier.

15. The method of claim 12, wherein:
the granular media is a filter bed having at least one layer of filter media.

16. The method of claim 12, wherein:
the granular media is a filter bed having a plurality of layers of granular media.

17. The method of claim 16, wherein:
the filter bed is supported above the underdrain by one of the following: (i) one or more layers of support gravel, and (ii) a media retaining plate attached to the underdrain.

18. The method of claim 17, wherein:
the media retaining plate is a porous plate.

* * * * *